(12) United States Patent
Jang

(10) Patent No.: US 8,882,092 B2
(45) Date of Patent: Nov. 11, 2014

(54) MOUNT BUSHING OF STABILIZER BAR FOR VEHICLE

(75) Inventor: Daewon Jang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 79 days.

(21) Appl. No.: 13/529,763

(22) Filed: Jun. 21, 2012

(65) Prior Publication Data

US 2013/0028547 A1 Jan. 31, 2013

(30) Foreign Application Priority Data

Jul. 29, 2011 (KR) .................... 10-2011-0076225

(51) Int. Cl.
*B60G 21/055* (2006.01)
*B60G 11/22* (2006.01)

(52) U.S. Cl.
CPC .... *B60G 21/0551* (2013.01); *B60G 2204/1222* (2013.01); *B60G 2204/41* (2013.01)
USPC ............. 267/294; 267/141; 280/124.107; 384/285

(58) Field of Classification Search
CPC ........... B60G 21/0551; B60G 2204/41; B60G 2204/1222
USPC ........... 267/292, 293, 140, 140.3, 140.4, 141, 267/294, 140.11; 384/285
See application file for complete search history.

(56) References Cited

U.S. PATENT DOCUMENTS

| | | | | |
|---|---|---|---|---|
| 2,324,997 | A * | 7/1943 | Brown | 267/269 |
| 4,491,429 | A * | 1/1985 | Matoba et al. | 384/221 |
| 4,671,678 | A * | 6/1987 | Munch | 384/125 |
| 4,707,149 | A * | 11/1987 | Hahle | 384/294 |
| 4,767,108 | A * | 8/1988 | Tanaka et al. | 267/140.12 |
| 4,854,766 | A * | 8/1989 | Hein | 403/224 |
| 4,916,749 | A * | 4/1990 | Urban et al. | 384/298 |
| 5,013,166 | A * | 5/1991 | Domer | 384/220 |
| 5,263,778 | A * | 11/1993 | Jordens et al. | 384/140 |
| 5,290,018 | A * | 3/1994 | Watanabe et al. | 267/293 |
| 5,352,044 | A * | 10/1994 | Jordens et al. | 384/140 |
| 5,520,465 | A * | 5/1996 | Kammel | 384/220 |
| 5,820,115 | A * | 10/1998 | Stevenson et al. | 267/293 |
| 5,984,283 | A * | 11/1999 | Tsuiki et al. | 267/33 |
| 6,170,812 | B1 * | 1/2001 | Nicoles | 267/281 |
| 6,474,631 | B2 * | 11/2002 | Hadano et al. | 267/276 |
| 6,619,639 | B1 * | 9/2003 | Shelley et al. | 267/292 |
| 6,893,034 | B2 * | 5/2005 | Fader | 280/124.166 |
| 7,341,245 | B2 * | 3/2008 | Joseph | 267/141 |

FOREIGN PATENT DOCUMENTS

| | | |
|---|---|---|
| JP | 4160178 B2 | 7/2008 |
| KR | 10-0527718 B1 | 11/2005 |
| KR | 10-2011-0023274 A | 3/2011 |

* cited by examiner

*Primary Examiner* — Thomas Irvin
(74) *Attorney, Agent, or Firm* — Morgan, Lewis & Bockius LLP

(57) ABSTRACT

A mount bushing assembly of a stabilizer bar for a vehicle, may include an inner bushing including a rubber member having a tubular shape and coupled to an external circumference of the stabilizer bar, and a pipe enclosing an external circumference of the rubber member, a sliding bearing including a pair of bearings coupled to upper and lower portions of an external circumference of the inner bushing, and a bracket including upper and lower brackets that may be coupled each other, and integrally formed at an interior surface thereof with an upper outer bushing and a lower outer bushing respectively, wherein the bracket may be fixed to a vehicle body in a state of enclosing the sliding bearing.

9 Claims, 8 Drawing Sheets

MOUNT BUSHING OF STABILIZER BAR FOR VEHICLE

CROSS-REFERENCE TO RELATED APPLICATION

The present application claims priority to Korean Patent Application No. 10-2011-0076225 filed in the Korean Intellectual Property Office on Jul. 29, 2011, the entire contents of which is incorporated herein for all purposes by this reference.

BACKGROUND OF THE INVENTION

1. Field of the Invention

The present invention relates to a mount bushing of a stabilizer bar applicable to a suspension system of a vehicle. More particularly, the present invention relates to a mount bushing of a stabilizer bar for a vehicle that enhances marketability and fuel economy of the vehicle by reducing noise and friction and improves durability by preventing foreign materials and grease respectively from flowing into or flowing out.

2. Description of Related Art

A stabilizer bar of a vehicle is applied to an independent suspension system, and is a type of torsional springs that secures balance of a vehicle body by suppressing roll motion of vehicle body when the vehicle turns or drives on a rough road.

FIG. 1 is a top plan view of a suspension system for explaining structures of a conventional stabilizer bar.

Referring to FIG. 1, both ends of the stabilizer bar 2 are respectively connected to lower control arms 8 and 10 or strut assemblies 12 and 14 through control links 4 and 6.

In addition, both side portions of a middle linear portion of the stabilizer bar 2 are fixed to a sub frame 16 through mount bushings 18 and 20.

The stabilizer bar 2 described above operates as an auxiliary spring that supports left and right wheels when the vehicle body rolls. When the left and right wheels move with the same phase, a force is not applied to the stabilizer bar 2. When the left and right wheels, on the contrary, move with different phases, the stabilizer bar 2 restricts movements of the left and right wheel by torsional elastic force so as to suppress the roll of the vehicle body.

For example, the stabilizer bar 2 applies elastic force to the both wheels so as to synchronize movements of the both wheels when the vehicle turns (i.e., when the outer wheel to a turning direction bounds and the inner wheel to the turning direction rebounds). Therefore, the stabilizer bar 2 suppresses tilt of the vehicle body. On the contrary, the stabilizer bar 2 does not apply the elastic force when the both wheels move to the same direction.

In addition, the conventional mount bushing 18 and 20 that fixes the both side portions of the middle linear portion of the stabilizer bar 2 to the sub frame 16 is shown in FIG. 2 and FIG. 3.

FIG. 2A is a cross-sectional view of a mount bushing of lubrication type.

Referring to FIG. 2A, the mount bushing 18 and 20 of lubrication type includes a bracket 22 and a rubber bushing 24 to which lubrication ingredient is added, and the bracket 22 is fixed to the vehicle body or the sub frame 16 in a state of enclosing the rubber bushing 24.

The stabilizer bar 2 having a circular cross-section penetrates through and is fixed to a center portion of the rubber bushing 24. Therefore, the rubber bushing 24 reduces noise or vibration caused by movements of the stabilizer bar 2. In addition, the rubber bushing 24 affects on roll strength according to compression force to the stabilizer bar 2.

FIG. 2B is a cross-sectional view for explaining development of minute deformation of I region in FIG. 2A.

Referring to FIG. 2B, if the stabilizer bar 2 rotates by about 2°-3° in the mount bushing 18 and 20 of lubrication type, the rubber bushing 24 begins to deform and then is slipped.

If the rubber bushing 24 is slipped, noise occurs. Particularly, as the rubber bushing 24 becomes aged, the noise gets louder.

FIG. 3A is a cross-sectional view of a mount bushing of double steel type.

Referring to FIG. 3A, the mount bushing 18 and 20 of double steel type like the mount bushing of lubrication type includes the bracket 22 and the rubber bushing 24, and a double steel bushing 26 is inserted in the rubber bushing 24. When the stabilizer bar 2 rotates, the mount bushing 18 and 20 of double steel type uses the double steel bushing 26 so as not to occur slip.

FIG. 3B is a cross-sectional view for explaining development of minute deformation of II region in FIG. 3A.

Referring to FIG. 3B, since slip does not occur in the mount bushing 18 and 20 of double steel type, noise problem can be solved. However, rotating torque increases proportional to a rotation of the stabilizer bar 2. Therefore, friction may increase and fuel economy may be deteriorated in a case that the vehicle moves excessively.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mount bushing of a stabilizer bar for a vehicle having advantages of increasing marketability and fuel economy of the vehicle by using structures of a sliding bearing and reducing noise and friction, and of improving durability by preventing foreign materials from flowing into or preventing grease from flowing out.

In an aspect of the present invention, a mount bushing assembly of a stabilizer bar for a vehicle, may include an inner bushing including a rubber member having a tubular shape and coupled to an external circumference of the stabilizer bar, and a pipe enclosing an external circumference of the rubber member, a sliding bearing including a pair of bearings coupled to upper and lower portions of an external circumference of the inner bushing, and a bracket including upper and lower brackets that are coupled each other, and integrally formed at an interior surface thereof with an upper outer bushing and a lower outer bushing respectively, wherein the bracket is fixed to a vehicle body in a state of enclosing the sliding bearing.

The inner bushing may further include a cut-out section formed along a length direction at a side of the inner bushing, wherein the inner bushing is assembled to an exterior circumference of the stabilizer bar by spreading the cut-out section.

The cut-out section extends to the rubber member along a length direction thereof.

The inner bushing may further include large diameter portions formed at both distal end portions of the pipe, wherein the sliding bearing is assembled to an exterior circumference of the pipe between the large diameter portions.

The sliding bearing is made of Teflon family.

The sliding bearing may further include flanges protruded radially outwardly at both distal end portions thereof.

The mount bushing assembly may further include at least one lip formed at an interior surface of both distal end portions of the outer bushing.

The at least one lip may have a free end extending toward the corresponding flanges and engaged thereto.

The mount bushing assembly may further include sealing means between both end portions of the pipe of the inner bushing and both end portions of the outer bushing.

The sealing means may include at least one lip formed at an interior surface of the both distal end portions of the outer bushing.

The at least one lip may have a free end extending toward an end portion of the pipe close to the at least one lip.

The lip may have the free end closely contacted with an exterior circumference of the pipe.

The pipe is made of metal material.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
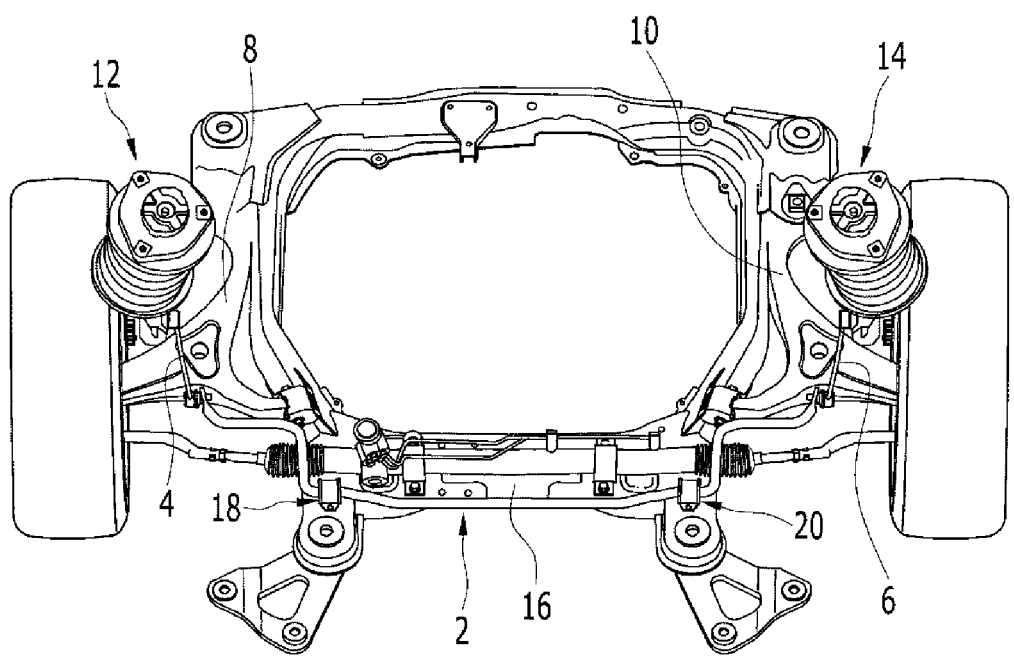
FIG. 1 is a top plan view of a suspension system for explaining structures of a conventional stabilizer bar.
Figure 2A:
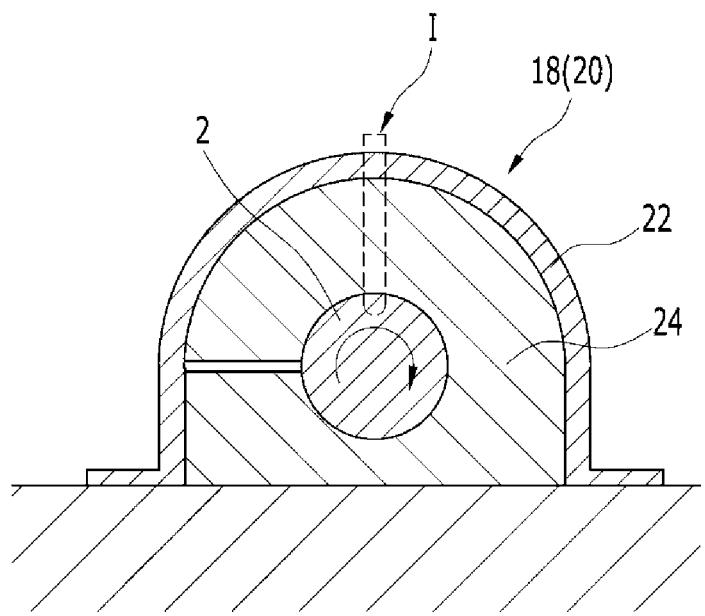
FIG. 2A and FIG. 2B are a cross-sectional view of an exemplary conventional mount bushing of a stabilizer bar and a cross-sectional view for explaining development of minute deformation.
Figure 2B:
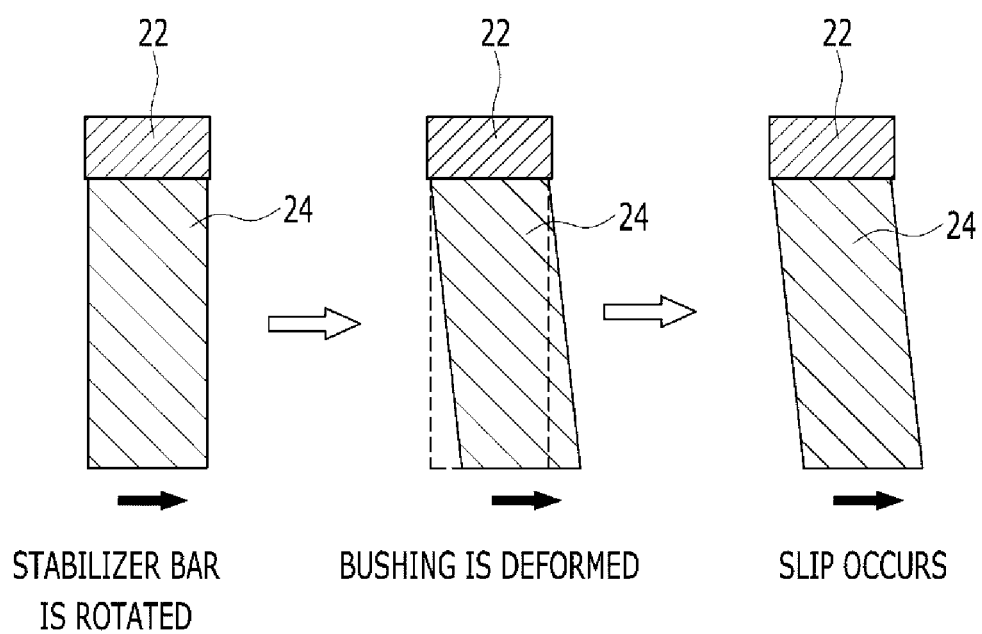
Figure 3A:
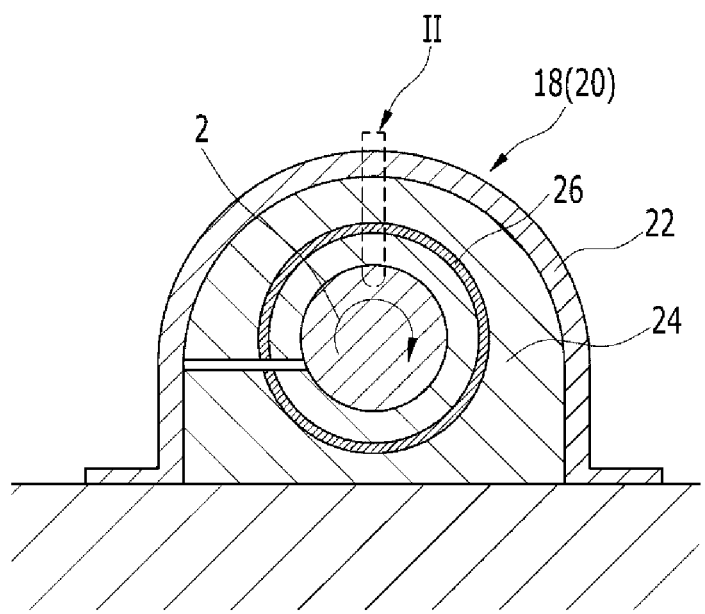
FIG. 3A and FIG. 3B are a cross-sectional view of another exemplary conventional mount bushing of a stabilizer bar and a cross-sectional view for explaining development of minute deformation.
Figure 3B:
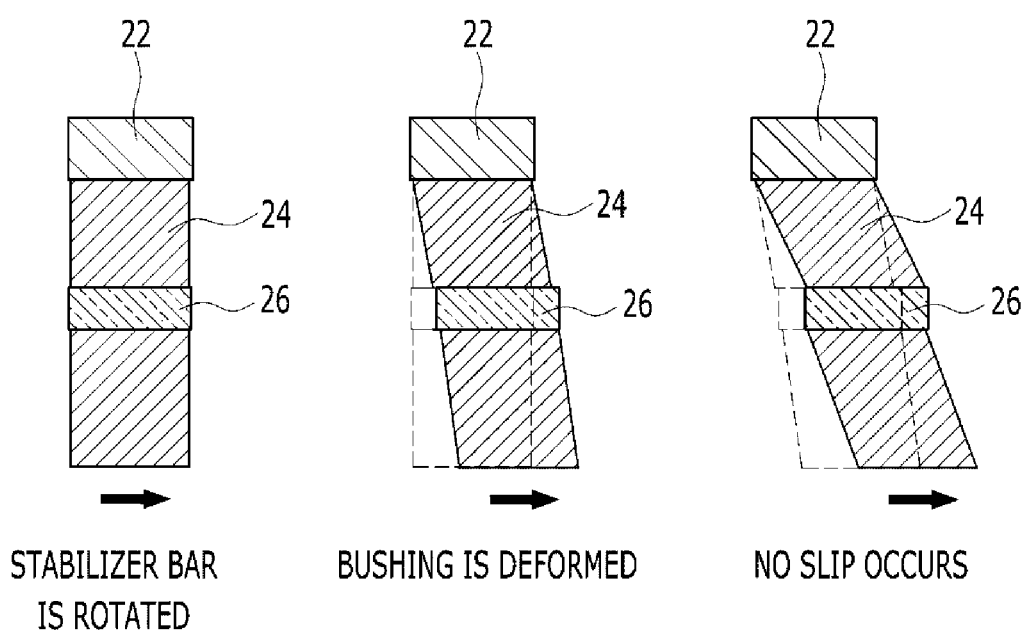

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will be described in detail with reference to the accompanying drawings.

Description of components which are not necessary for explaining the present invention will be omitted, and the same constituent elements are denoted by the same reference numerals in this specification.

In the detailed description, ordinal numbers are used for distinguishing constituent elements having the same terms, and have no specific meanings.

Figure 4:
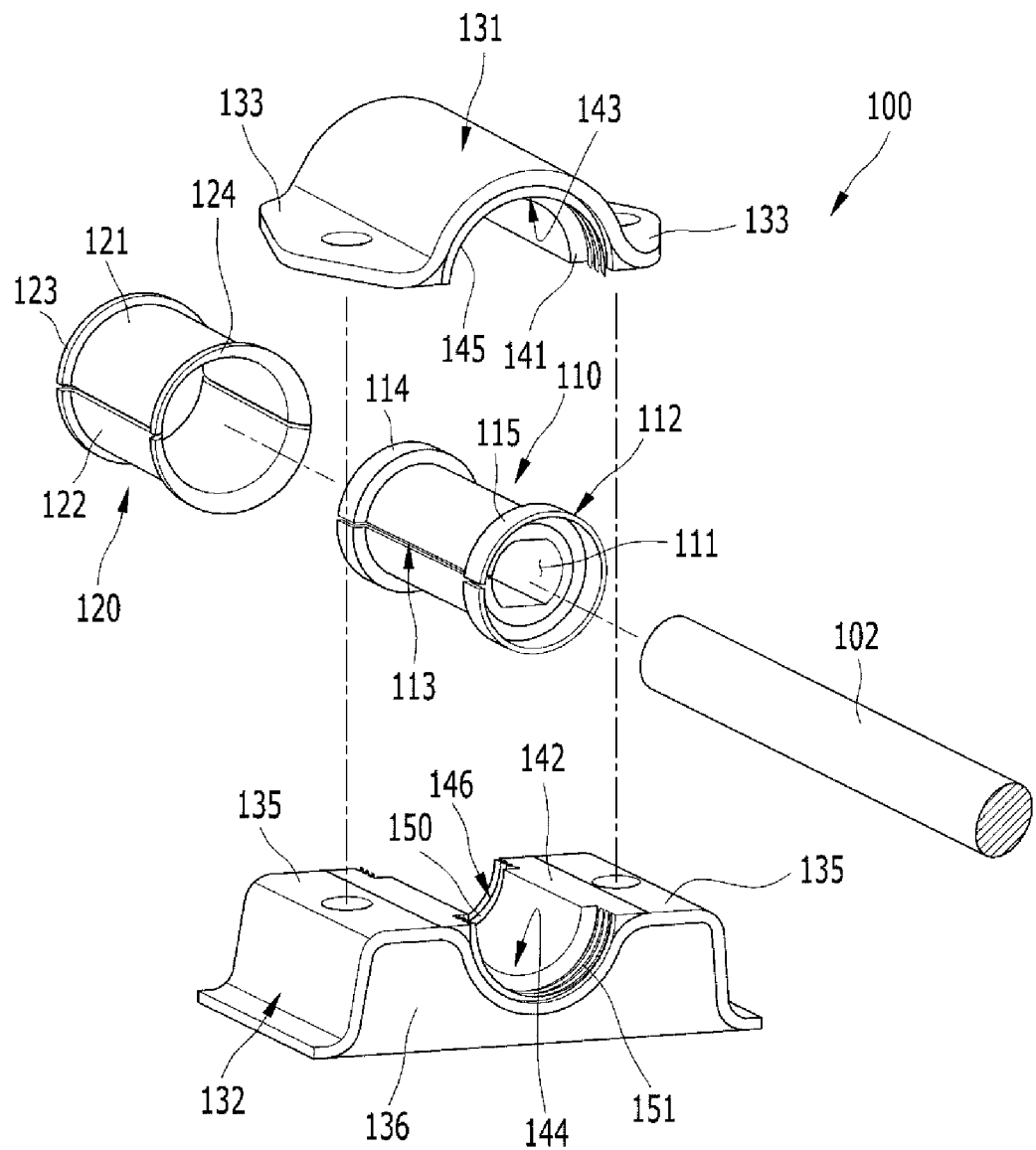
FIG. 4 is an exploded perspective view of a mount bushing according to an exemplary embodiment of the present invention.
Figure 5:
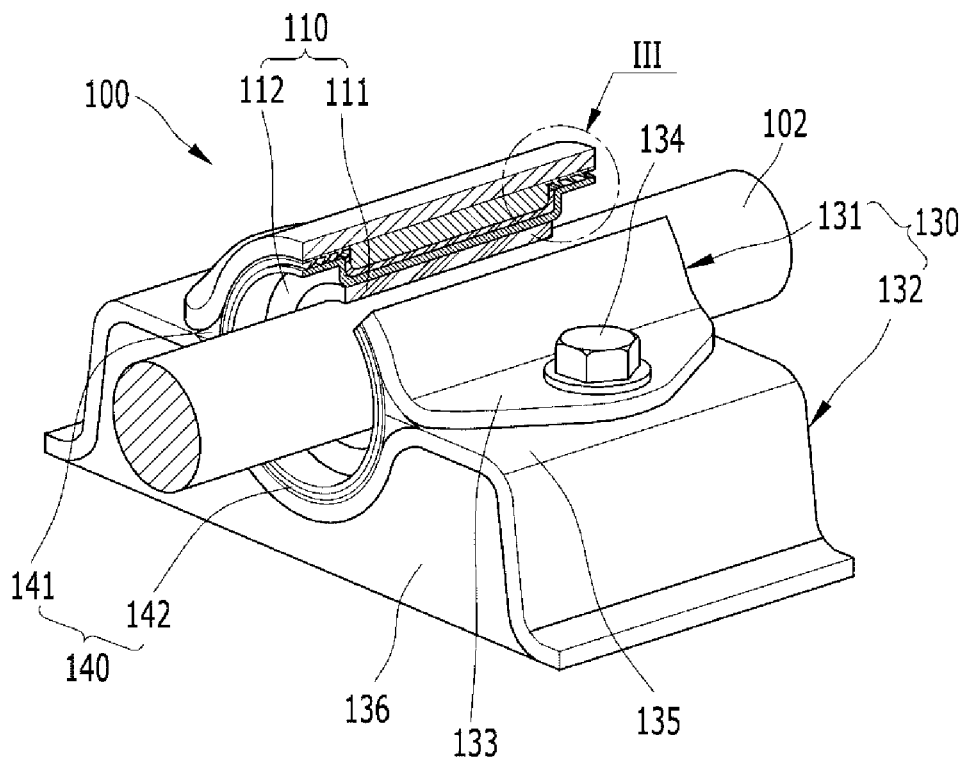
FIG. 5 is a perspective view of a mount bushing according to an exemplary embodiment of the present invention that is partially cut-out.
Figure 6:
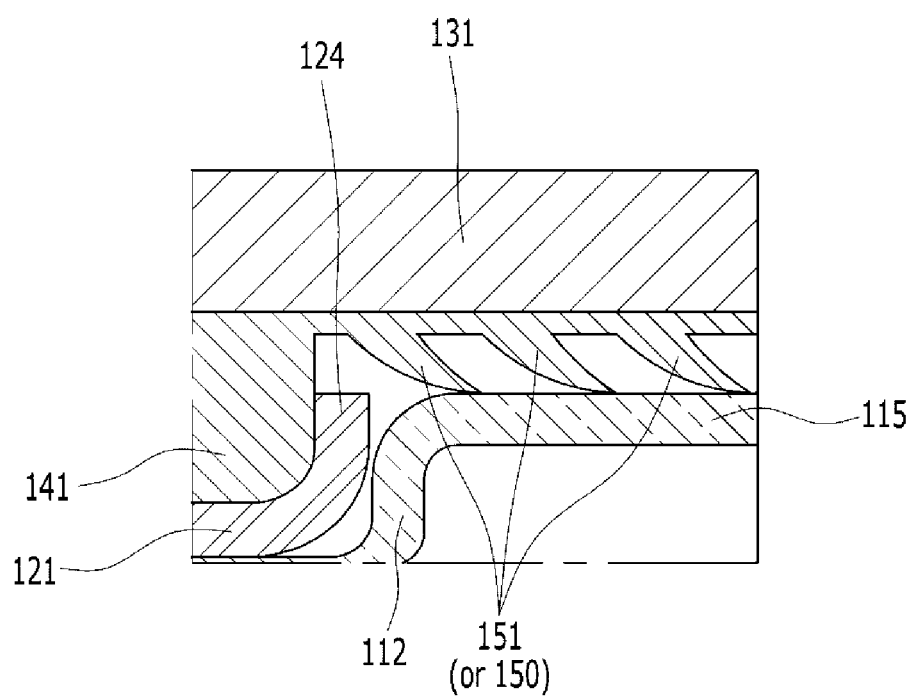
FIG. 6 is an enlarged cross-sectional view of III region in FIG. 5.

FIG. 4 to FIG. 6 are drawings that illustrate a mount bushing of a stabilizer bar according to an exemplary embodiment of the present invention. In the drawings, reference numeral 100 designates an overall mount bushing.

The mount bushing 100, as shown in FIG. 4 and FIG. 5, includes an inner bushing 110, a sliding bearing 120, and a bracket 130. In addition, the mount bushing 100 further includes an outer bushing 140, and the outer bushing 140 includes an upper outer bushing 141 and a lower outer bushing 142.

The inner bushing 110 has a tubular shape, and includes a resilient rubber member 111 and a pipe 112 enclosing an external circumference of the rubber member 111 and made of metal material.

In addition, a cut-out section 113 is formed along at a length direction at a side of the inner bushing 110. After the inner bushing 110 is positioned at the external circumference of the stabilizer bar 102 by spreading the cut-out section 113, the cut-out section 113 is closed so as to mount the inner bushing 110 at the external circumference of the stabilizer bar 102.

In an exemplary embodiment of the present invention, the cut-out section 113 may extend along a length direction of the resilient rubber member 111.

In addition, large diameter portions 114 and 115 are formed respectively at both end portions of the pipe 112, the sliding bearing 120 is received at an exterior circumference of the pipe 112 between the large diameter portions 114 and 115.

The sliding bearing 120 includes a pair of bearings 121 and 122 having semi-cylindrical shape, and the pair of bearings 121 and 122 are assembled respectively to upper and lower external circumferences of the pipe 112.

In addition, flanges 123 and 124 protruded radially outwardly are formed at both ends of the sliding bearing 120 such that the sliding bearing 120 is stably received to the pipe 112.

The sliding bearing 120 minimizes friction between the pipe 112 and the outer bushing 140.

The sliding bearing 120 is made of low-friction material of Teflon family (BI-MESH: Teflon+copper mesh).

The low-friction material of Teflon family is light and has high assemblability, high load-carrying capacity, low friction coefficient, low coefficient of thermal expansion, low thermal conductivity, enhanced formability, and enhanced chemical resistance.

The bracket 130 includes upper and lower brackets 131 and 132 separately manufactured, and the upper outer bushing 141 and the lower outer bushing 142 are integrally formed respectively with interior circumferences of the upper and lower brackets 131 and 132. The upper and lower brackets 131 and 132 are assembled to an external circumference of the sliding bearing 120.

Therefore, the stabilizer bar 102 is mounted at the vehicle body or the sub frame through the mount bushing 100.

The upper bracket 131 is made of metal material and has a semi-cylindrical shape. The upper outer bushing 141 is mounted at an interior circumference of the upper bracket 131, and a pair of fixing portions 133 for fixing the upper bracket 131 to the lower bracket 132 is protruded from both sides of the upper bracket 131. A first bolt hole is formed at the fixing portion 133.

In addition, the lower bracket 132 is made of metal material, and a pair of flat portions 135 for assembling the fixing portion 133 of the upper bracket 131 is formed. A second bolt hole corresponding to the first bolt hole is formed at the flat portion 135. After the first bolt hole of the fixing portion 133 and the second bolt hole of the flat portion 135 are aligned, a fixing bolt 134 is simultaneously inserted in the first and second bolt holes so as to assemble the upper bracket 131 with the lower bracket 132.

In addition, the lower bracket 132 is provided with a concave groove of semi-cylindrical shape between the pair of flat portions 135, and the lower outer bushing 142 is attached to an upper surface of the concave groove.

In addition, a rubber member 136 is provided at a lower portion of the lower bracket 132. The rubber member 136 is functioned as a shock-absorber between the mount bushing 100 and the vehicle body or the sub frame.

The upper and lower outer bushings 141 and 142 constituting the outer bushing 140 are made of resilient rubber material. The upper and lower outer bushings 141 and 142 respectively include small diameter portions 143 and 144 at middle portions thereof and large diameter portions 145 and 146 at both end portions thereof.

The small diameter portions 143 and 144 are adapted to be fixed between the flanges 123 and 124 of the sliding bearing 120, and the large diameter portions 145 and 146 are adapted to be positioned apart from the large diameter portions 114 and 115 of the pipe 112.

In addition, sealing means are formed at the large diameter portions 145 and 146 of the outer bushing 140 so as to prevent foreign materials from flowing into the mount bushing 100, as shown in FIG. 6.

In one or more exemplary embodiments, the sealing means include at least one lip 150 and 151 formed at an interior circumference of the large diameter portions 145 and 146.

One lip 150 and 151 is positioned apart from another lip 150 and 151 with a predetermined distance, and a free end of the lip 150 and 151 is extended toward an end of the pipe 112 that is closest to the lip 150 and 151. The free end is closely contacted with the large diameter portion 145 and 146 of the pipe 112 so as to prevent the foreign materials from flowing into the mount bushing 100 from the exterior.

As described above, since the cut-out section 113 is formed at the inner bushing 110 according to an exemplary embodiment of the present invention, a mount position of the inner bushing 110 at the stabilizer bar 102 may be easily changed. Therefore, assemblability of the mount bushing 100 to the stabilizer bar 102 may be improved.

Because lower surface shapes (plane shape or groove shape) of stabilizer bar mount bushings of front and rear sub frames are different according to vehicle models, communization of the mount bushings may be very limited according to conventional arts. Because a rubber shape of a lower bracket, however, can be changed according to a shape of a mount bushing according to an exemplary embodiment of the present invention, communization according to diameters of the stabilizer bar is possible.

According to a conventional mount bushing, sealing portions are deformed by bending of the stabilizer bar, and thus sealing performance is hard to be secured when the vehicle moves. However, because the cut-out section 113 is formed at the inner bushing 110 and the outer bushing 141 and 142 is divided into two portions, the sealing portions of the stabilizer bar 102 are hardly deformed and thus sealing performance may be greatly improved when the vehicle moves according to an exemplary embodiment of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mount bushing assembly of a stabilizer bar for a vehicle, comprising:
    an inner bushing including:
        a rubber member having a tubular shape and coupled to an external circumference of the stabilizer bar; and
        a pipe enclosing an external circumference of the rubber member;
    a sliding bearing including a pair of bearing sleeves coupled to upper and lower portions of an external circumference of the inner bushing;
    a bracket including upper and lower brackets that are coupled to each other, and an upper outer bushing and a lower outer bushing which form an outer bushing and are integrally formed on interior surfaces of the upper and lower brackets, respectively, wherein the bracket encloses the sliding bearing when the bracket is fixed to a vehicle body;
    wherein the rubber member and the pipe of the inner bushing each include a single cut-out section extending along a length direction along one side of the inner bushing, wherein the cut-out section allows the rubber member and the pipe of the inner bushing to be spread apart assembled around an exterior circumference of the stabilizer bar;
    wherein the sliding bearing further includes flanges protruded radially outwardly at both distal end portions thereof; and
    at least one lip formed at an interior surface of both distal end portions of the outer bushing.

2. The mount bushing assembly of claim 1, wherein the cut-out section extends to the rubber member along a length direction thereof.

3. The mount bushing assembly of claim 1, wherein the inner bushing further includes large diameter portions formed at both distal end portions of the pipe, and
    wherein the sliding bearing is assembled to an exterior circumference of the pipe between the large diameter portions.

4. The mount bushing assembly of claim 1, wherein the sliding bearing is made of polytetrafluoroethylene (PTFE).

5. The mount bushing assembly of claim 1, wherein the at least one lip has a free end extending toward the corresponding flanges and engaged thereto.

6. The mount bushing assembly of claim 1, wherein the pipe is made of metal material.

7. A mount bushing assembly of a stabilizer bar for a vehicle, comprising:
- an inner bushing including:
  - a rubber member having a tubular shape and coupled to an external circumference of the stabilizer bar; and
  - a pipe enclosing an external circumference of the rubber member;
- a sliding bearing including a pair of bearing sleeves coupled to upper and lower portions of an external circumference of the inner bushing;
- a bracket including upper and lower brackets that are coupled to each other, and an upper outer bushing and a lower outer bushing which form an outer bushing and are integrally formed on interior surfaces of the upper and lower brackets, respectively, wherein the bracket encloses the sliding bearing when the bracket is fixed to a vehicle body;
- wherein the rubber member and the pipe of the inner bushing each include a single cut-out section extending along a length direction along one side of the inner bushing, wherein the cut-out section allows the rubber member and the pipe of the inner bushing to be spread apart assembled around an exterior circumference of the stabilizer bar; and
- sealing means between both end portions of the pipe of the inner bushing and both distal end portions of the outer bushing;
- wherein the sealing means includes at least one lip formed at an interior surface of the both distal end portions of the outer bushing.

8. The mount bushing assembly of claim 7, wherein the at least one lip has a free end extending toward an end portion of the pipe close to the at least one lip.

9. The mount bushing assembly of claim 7, wherein the lip has the free end closely contacted with an exterior circumference of the pipe.

* * * * *